United States Patent [19]
Nagin

[11] 3,992,163
[45] Nov. 16, 1976

[54] ALUMINUM-CONTAINING WELDED GRATING

[75] Inventor: Harold Nagin, Pittsburgh, Pa.

[73] Assignee: Reliance Steel Products Company, McKeesport, Pa.

[22] Filed: Feb. 10, 1971

[21] Appl. No.: 114,327

Related U.S. Application Data

[60] Division of Ser. No. 583,270, Sept. 30, 1969, Pat. No. 3,469,300, and a continuation-in-part of Ser. No. 832,150, June 11, 1969, abandoned.

[52] U.S. Cl. .............................................. 29/191.6
[51] Int. Cl.² ........................................ B32B 15/20
[58] Field of Search ............ 52/668, 667, 666, 664; 29/193, 193.5, 191.4, 191.6, 470.3, 160

[56] References Cited
UNITED STATES PATENTS

| 1,158,154 | 10/1915 | Albree ................................. 52/668 |
| 2,006,929 | 7/1935 | Nagin .................................... 52/668 |
| 2,691,815 | 10/1954 | Boessenkool ................... 29/192 CP |
| 2,767,627 | 10/1956 | Lynn et al ............................. 52/668 |
| 3,523,396 | 8/1970 | DeJonge .............................. 52/668 |

FOREIGN PATENTS OR APPLICATIONS

| 572,789 | 10/1945 | United Kingdom ................ 29/470.3 |
| 1,011,128 | 11/1965 | United Kingdom ................ 29/470.3 |
| 1,014,988 | 12/1965 | United Kingdom ................ 29/470.3 |

*Primary Examiner*—Allen B. Curtis
*Attorney, Agent, or Firm*—Parmelee, Miller, Welsh & Kratz

[57] ABSTRACT

A new article of manufacture comprising a grating is disclosed. The grating comprises spaced longitudinally extending metal bearing bars and spaced metal cross bars welded to the bearing bars at intervals therealong by fusion welding, and wherein the welds are friction welds formed by reciprocating each of the cross bars under vertical pressure transverse to the bearing bars.

5 Claims, 10 Drawing Figures

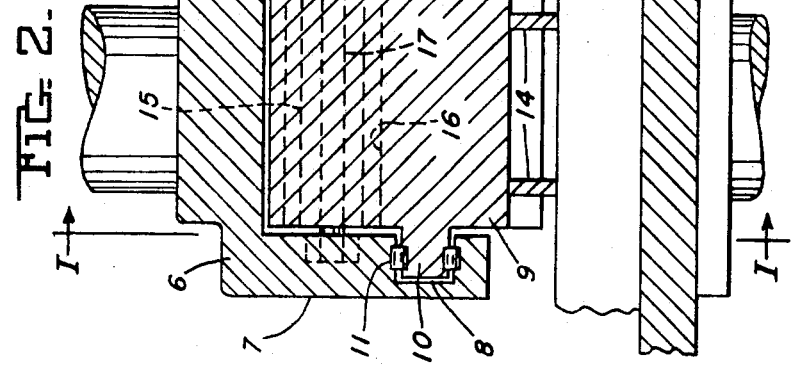
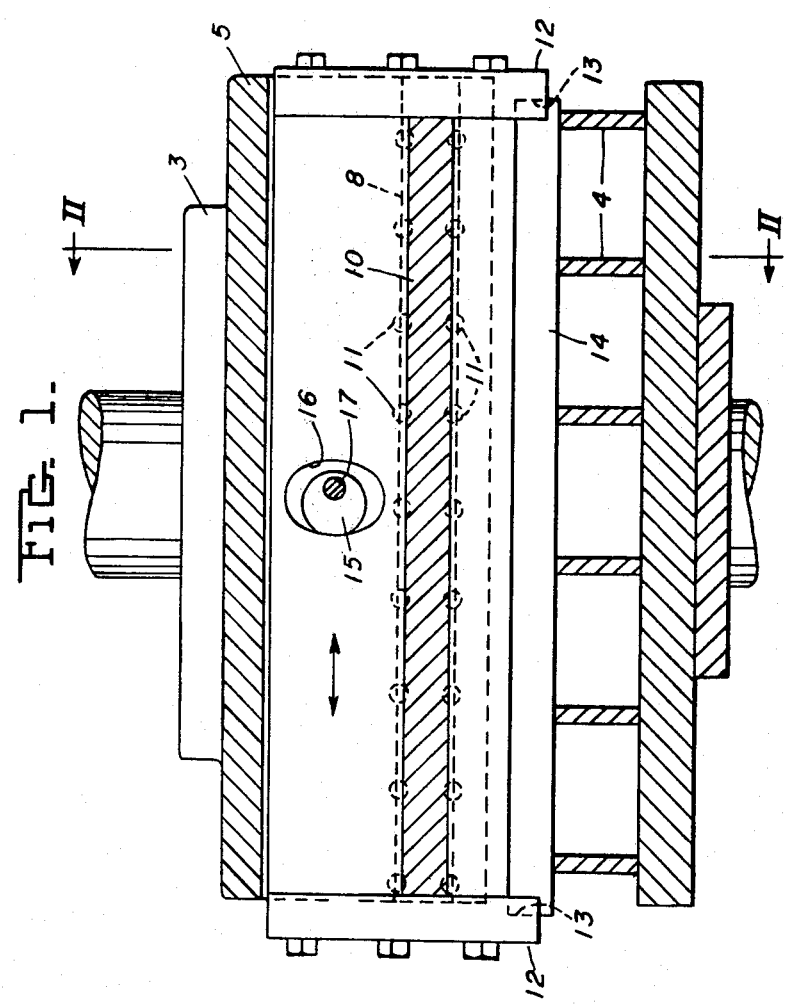

ALUMINUM-CONTAINING WELDED GRATING

This application is a division of my earlier application Serial No. 583,270 for Method for Friction Welding Metal Bars, now U.S. Pat. No. 3,469,300 dated Sept. 30, 1969, and is a continuation-in-part application of the co-pending divisional application Ser. No. 832,150 dated June 11, 1969, now abandoned.

This invention relates to welded gratings and other similar structures, and particularly to such structures wherein their bearing bars and cross bars are joined by friction welds.

Metal gratings such as are used on bridges and other similar structures have beeen formed by the familiar practice of joining the bearing and cross bars by electro-pressure welding. It has been found that in those structures the welds formed are defective resulting in gratings which fail in use under heavy traffic, so that either repairs must be made, or the bridge floor where the grating is used may become quite noisy, even before any breakage of the cross bars occur.

This invention overcomes the problem of electropressure weld failure in metal gratings by providing a grating in which the bearing and cross bars are joined by a friction weld. It has been found that uniformity of welds results from the fact that when the cross bars are reciprocated against the bearing bars heat will be developed at the points where the friction is the greatest. This will raise the temperature of the metal to a point where only a film of molten metal, little more than molecular thickness, develops. This will act as a lubricant to reduce the friction momentarily while the weld develops at the other intersections. As a result of this, all of the welds will be eventually developed uniformly, whereas with pressure-electrical welding, the welds cannot be developed uniformly because the electrical resistance characteristics and the flow of stray electrical current cannot be uniform or controlled in any way that will be useful. Thus the pressure-electrical welds of gratings are found frequently to be defective with the consequent premature failure of the gratings when in use under heavy traffic.

A typical method followed in forming gratings by welding the bars using electro-pressure welding is to support the spaced bearing bars on the lower platen of a press and then to place the spaced cross bars over the top edges of the bearing bars while confining the cross bars against an upper platen. The under surface of the upper platen is arranged to include electrodes of opposite polarity which engage adjacent cross bars. When current is applied to the electrodes, current will flow through one cross bar along the length of the bearing bars into the other cross bar and through it to the other electrode. Heat is generated at the points where the cross bars contact the bearing bars, but the entire cross section of the cross bars, as well as a large portion of the length of the bearing bars, comprises the resistance circuit, and all of this mass of metal is heated to a high heat, so that as the heat develops, the cross bars will be pressed into the bearing with the weld developing at the intersections. Far more heat must be generated than that necessary to effect welding at the meeting surfaces of the cross bars and bearing bars. In addition to this, there will be irregularity in the conductivity of the metal, or irregularity perhaps due to oxide on the metal at some intersections where the cross bars contact the bearing bars, or other causes why the current flow between two cross bars in each bearing bar is not the same. The electrical current will, of course, travel the path of least resistance, so that one or more joints may be starved while others are over-heated. In addition to this, stray currents may flow along the length of a given cross bar through welds that are already completed, into another cross bar, finding a path of least resistance, and the energy of such stray currents is largely dissipated in this way.

As was pointed out earlier, friction welding avoids the non-uniform welds in gratings inherent in electro-pressure welding since the alternate melting and cooling of the metal is a regulating influence that causes the energy to automatically distribute itself into each intersection uniformly, and each friction weld, although seemingly developed continuously, actually develops in rapid increments of alternate fluidizing of the metal and hardening of the metal, ending up with a product wherein all of the welds between the cross bar and the bearing bars are uniform. There can be no starving of the energy at one intersection to favor another.

Also with friction welding, the action can be compared somewhat to the action of a saw in cutting a kerf, in that only the metal immediately affected by the friction is raised to welding temperature, and the surrounding metal does not have to be softened to enable the cross bars to be pressed down into the bearing bar. Consequently, the same amount of heat does not have to be generated to make a weld, and actually a weld develops much faster than with electro-pressure welding.

The present invention has particular application to aluminum gratings. Up to the present time all commercially prepared aluminum gratings had to be made with mechanical interlock of some kind between the cross bars and the bearing bars. This is because aluminum has a plastic range of only about 50° F between the point where it softens and the point where it liquifies or melts. With electro-pressure welding, it is impossible to control the temperature within this limited range of plasticity, with the result that the aluminum will melt at some points before a weld can be affected at others.

Other advantages and details of this invention will become apparent as the following description of certain present preferred embodiments thereof proceeds.

In the accompanying drawings I have shown certain present preferred embodiments of this invention in which:

FIG. 1 is a vertical section through one form of apparatus for making such welded grating, the section being taken in the general plane of line I—I of FIG. 2;

FIG. 2 shows a transverse vertical section in the plane of line II—II of FIG. 1;

FIG. 3 is a fragmentary view showing a modification in which the bearing bars are notched to initially receive the cross bars, and the cross bars are of upwardly-increasing section;

FIG. 4 is a view generally similar to FIG. 3 but showing the cross bar as a round section;

The present invention is directed to an article of manufacture, commonly referred to as welded metal grating, wherein a plurality of transversely spaced longitudinally extending load carrying or cross members are connected by a plurality of transverse intersecting bearing members placed longitudinally of the cross members and each of the bearing members at its areas of intersection with a cross member is fused thereto by a friction weld formed under pressure.

Prior to my invention, gratings were comprised of longitudinally extending bearing bars which were slotted to receive the cross bars, and the cross bars were secured in place either by pressing, spot welding or so-called well known electro-pressure welding wherein the cross bars were welded in place by machine welds under pressure. Each of such prior art gratings when subjected to rolling load would tend to loosen and vibrate causing destruction of the joint between the members. Also, where aluminum or similar metals were used to form the gratings the bars were secured to one another by a mechanical interlock rather than by welding.

In the present invention I propose to initially arrange a plurality of longitudinal disposed bearing bars in fixed spaced transverse relation, each bearing bar being slotted to a depth less than the depth of the cross bars to be received therein and to reciprocate each cross bar under pressure relative to the bearing bars to seat each cross bar to a desired depth within the bearing bars slots. During the reciprocation of the cross bars the opposing faces of the cross bars may be in abutting engagement with the sides and bottoms of each said slot or reciprocation is continued until such engagement is effected, so as to raise the engaging sliding faces to a molten condition. Thereafter, reciprocation may be discontinued, but the pressure maintained until the abutting member faces are cooled and fused into an integral whole.

Figure 5:
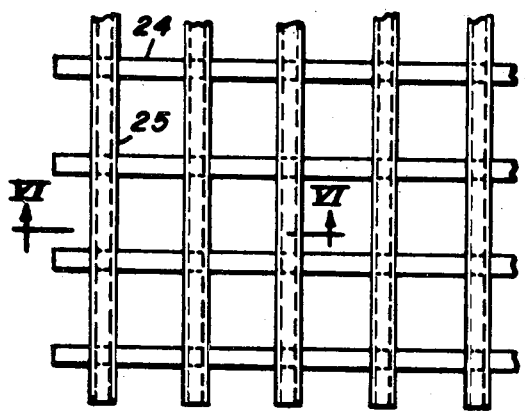
FIG. 5 shows a partial plan view of a section of grating as the article of manufacture.
Figure 6:
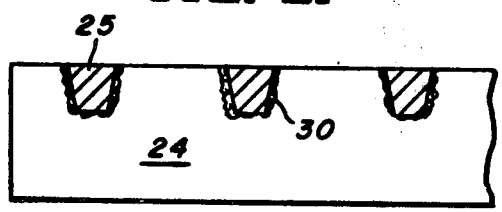
FIG. 6 shows a section taken on lines VI-VI of FIG. 5.

Referring now to FIGS. 5 and 6 of the drawings, the bearing bars 24 are substantially rectangular in cross section and the cross bars 25 are wider at the top face than at the bottom face. The slots in longitudinal bars 24 are of a size less that the corresponding cross sectional area of cross bars 25 to be received therein. Thus, limited longitudinal reciprocation of cross bars 25 relative to the slotted bearing bars 24 under vertical pressure will raise the opposing engaging faces of both bars to a molten temperature around the periphery of the slots in bars 24 as cross bars 25 are pressed down into the bearing bar flush with the top surface thereof. At this point, reciprocation is discontinued but vertical pressure is maintained until the engaging bar faces cool, to provide a fused connection, that is, a friction weld, between the engaging faces of the bars.

As shown in FIG. 6, the cross bar 25 being of larger cross-sectional area than the slot initially formed in bearing bar 24, the frictional engagement between the engaging faces of bars 24 and 25 raises the temperature thereof to a molten state, whereby excess metal is extruded during reciprocation, as at 30.

Figure 7:
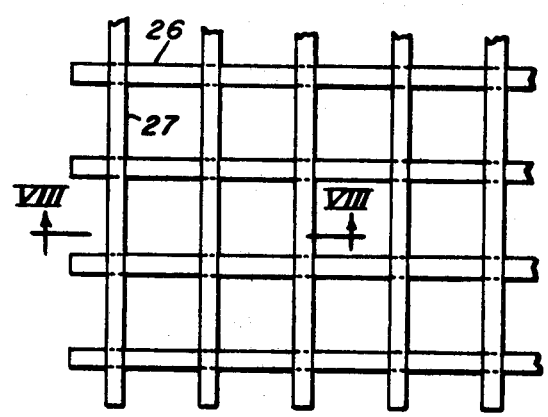
FIG. 7 shows a partial plan view of a section of grating illustrating a modified form of the article of manufacture.
Figure 8:
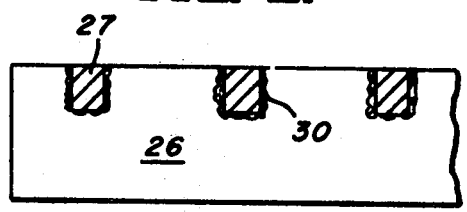
FIG. 8 shows a section taken on lines VIII-VIII of FIG. 7.

Referring now to FIGS. 7 and 8, the cross bars 27 are substantially rectangular and the slots in longitudinal bearing bars 26 are initially preferably of less width and depth than bars 27, whereby the side and bottom faces of cross bar 27 will provide sufficient friction within said longitudinal bar slots to raise the contacting bar surfaces to a molten temperature to thereby form a friction weld connection. Any excess metal is extruded as shown at 30, in FIG. 8.

Figure 9:
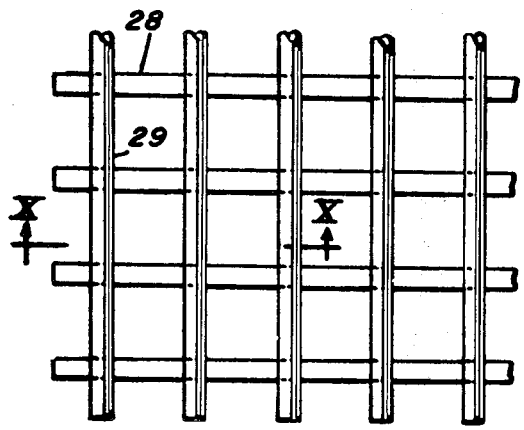
FIG. 9 shows a partial plan view of a section of grating illustrating a further modification of the article of manufacture.
Figure 10:
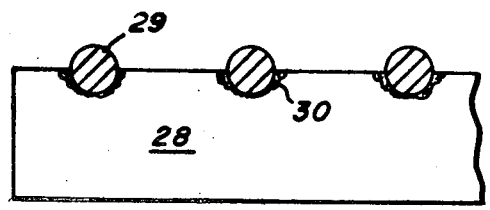
FIG. 10 shows a section taken on lines X-X of FIG. 9.

The construction shown in FIGS. 9 and 10 varies from the two previous examples in that the bearing bars 28 may be rectangular in cross section and the cross bars 29 may be of round cross-section. In this instance the slots formed in bearing bar 28 may be substantially semi-circular in cross section and of a depth less than one-half the diameter of cross bars 29. The bars 29 may be suitably reciprocated, as in FIGS. 6 and 8 to raise the engaging bar surfaces to a molten temperature. Thereafter, reciprocation is discontinued and veritcal pressure is maintained until the said molten film solidifies.

In each of the FIGS. 6, 8 and 10, the metal heated to a molten state, prior to seating of the bottom surfaces of the cross bars to a desired depth within the bearing bars, may extrude and adhere to the adjacent faces of the bars as shown in the figures. Since the cross bars are reciprocated only a short distance relative to the bearer bars, the amount of molten metal extruding upon the outer faces of the bearer bars may be very small. The effective molten metal forming the weld is that which is upon the abutting faces of the bearing bar slots and the adjacent faces of the cross bars. It is this molten metal which upon solidifying effects the friction weld joint between the intersecting members.

As described earlier, ferrous and non-ferrous metals may be employed to construct the gratings as described herein with the present invention having particular application to non-ferrous metal gratings such as aluminum, for example, wherein the non-ferrous metal has a low plastic range (e.g. below 100° F) between the point where it softens and the point where it liquifies or melts. Either or both of the bearing and cross bars may be formed from a non-ferrous metal.

The bearing bars 24, 26, 28 are preferably initially slotted for reception of the cross-bars, it being understood that the bearing bar slots are preferably less in width and depth than the cross bars to be received therein. However, as shown in my earlier issued patent 3,469,300, the bearing bars need not necessarily be slotted.

While I have shown and described certain present preferred embodiments of this invention, it is to be distinctly understood that the invention is not limited thereto but may be otherwise variously embodied within the scope of the following claims.

I claim:

1. A new article of manufacture comprising a grating having longitudinally extending spaced metal bearing bars and spaced metal cross bars welded to the bearing bars at intervals therealong by fusion welding, wherein the welds are friction welds formed by reciprocating under pressure one of said bars against the other, at least one set of said bearing and cross bars being formed of aluminum.

2. The new article of manufacture as set forth in claim 1 wherein said bearing bars and said cross bars are uniformly joined at their intersections by friction welds.

3. The new article of manufacture as set forth in claim 1 wherein another set of said bearing and cross bars is formed from a metal having a plastic range of less than 100° F between the point where it softens and the point where it melts.

4. The new article as set forth in claim 1 wherein said friction welds are formed by rapidly reciprocating each of said cross bars under vertical pressure relative to each of said bearing bars.

5. A new article of manufacture comprising a grating having a plurality of longitudinally extending transversely spaced bearing bars and a plurality of transversely extending intersecting cross bars spaced longitudinally of the bearing bars, each of said bearing bars being provided with corresponding slotted openings for receiving said cross bars, said bars being connected together throughout their areas of intersection by fusion welds wherein the welds are friction welds formed by rapidly reciprocating each cross bar under vertical pressure against said bearing bars, and wherein at least one set of said bearing and cross bars is formed from aluminum.

* * * * *